July 3, 1923.
A. R. BETHEL
1,460,363
VALVE MECHANISM FOR GLASS MACHINES
Filed Feb. 4, 1921    2 Sheets-Sheet 1
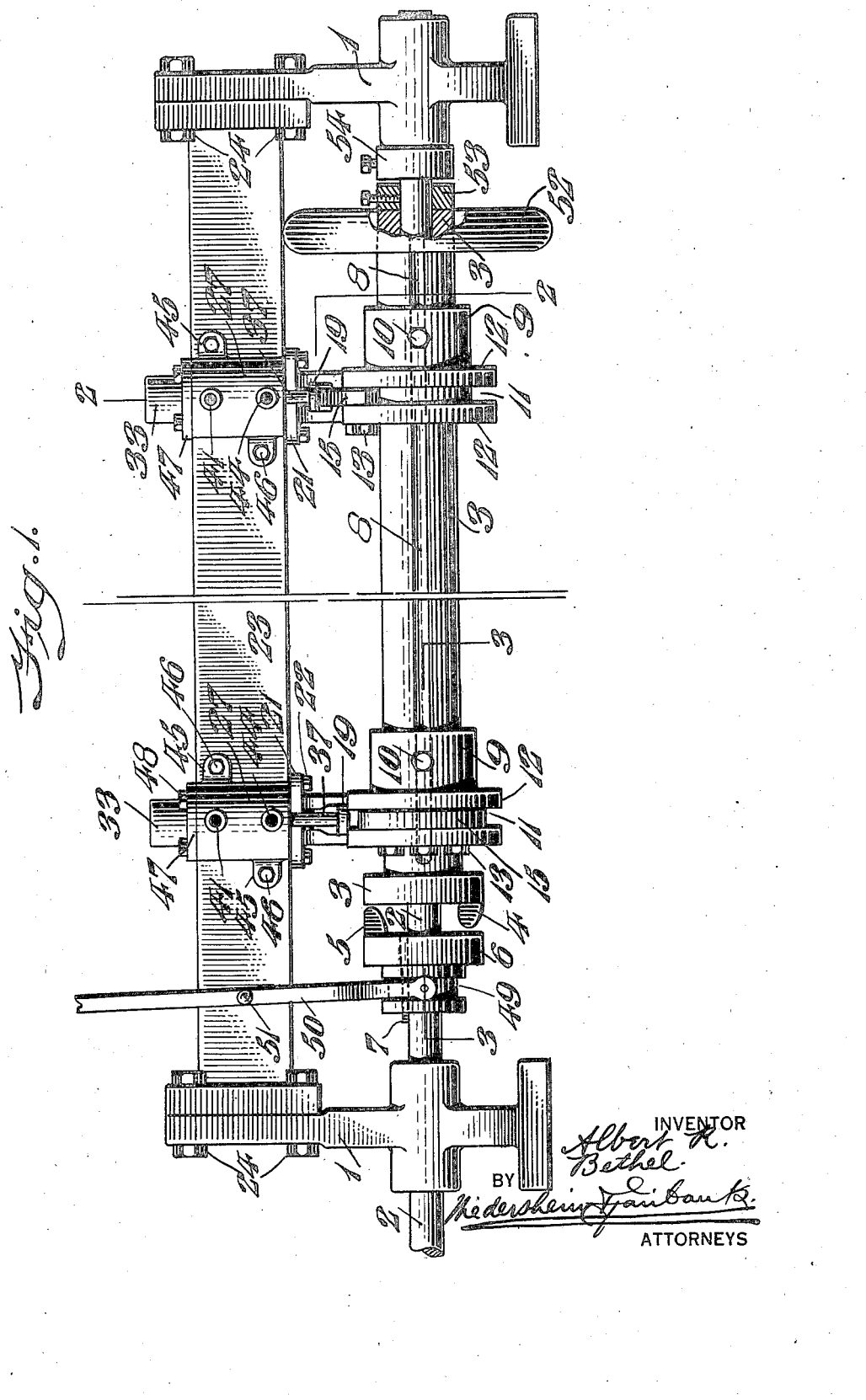
INVENTOR
Albert R. Bethel
BY
Niedershein Fairbanks
ATTORNEYS July 3, 1923.
A. R. BETHEL
1,460,363
VALVE MECHANISM FOR GLASS MACHINES
Filed Feb. 4, 1921     2 Sheets-Sheet 2
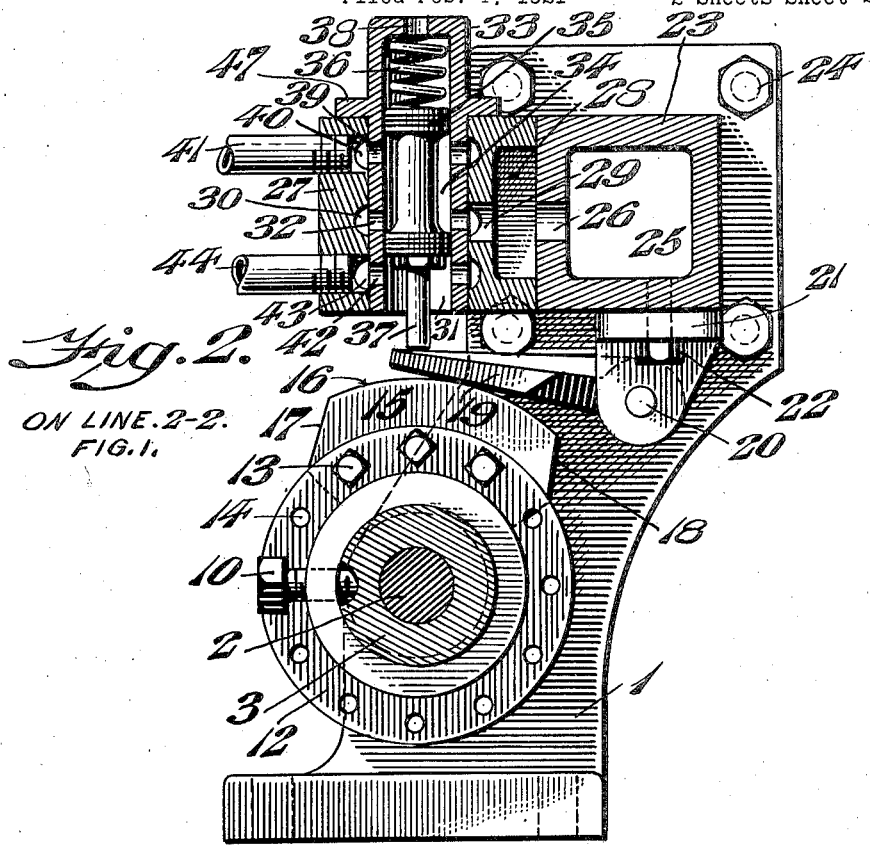
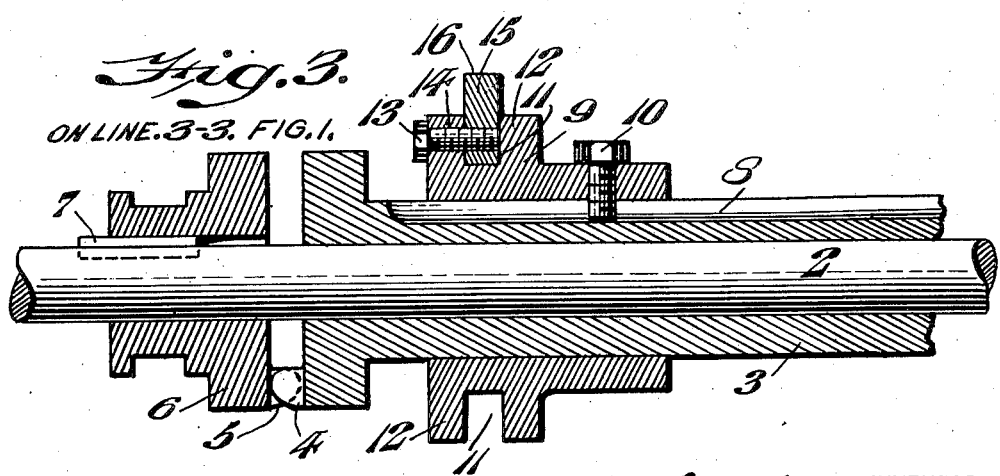
INVENTOR
Albert R. Bethel
BY
ATTORNEYS Patented July 3, 1923.

1,460,363

UNITED STATES PATENT OFFICE.

ALBERT R. BETHEL, OF MINOTOLA, NEW JERSEY, ASSIGNOR TO ILLINOIS GLASS COMPANY, OF BRIDGETON, NEW JERSEY, A CORPORATION OF ILLINOIS.

VALVE MECHANISM FOR GLASS MACHINES.

Application filed February 4, 1921. Serial No. 442,347.

*To all whom it may concern:*

Be it known that I, ALBERT R. BETHEL, a citizen of the United States, residing at Minotola, county of Atlantic, State of New Jersey, have invented a new and useful Valve Mechanism for Glass Machines, of which the following is a specification.

My present invention comprehends a novel construction and arrangement of a cam operated valve attachment which although especially designed to be employed in conjunction with glass machines is not limited to such use but may be employed in any case wherein a plurality of valves are used, the number of which depends upon the number of operations which are to be performed.

It further comprehends a novel construction of valve mechanism wherein a driven shaft has adjustably mounted thereon a plurality of cam supports to which cams are adapted to be adjustably connected, said cam supports being carried by a sleeve loosely mounted on said shaft and forming part of a clutch whereby all the cams can be rendered operative upon the proper actuation of a clutch lever to control the admission of motive fluid to operate a number of independent mechanisms.

Other novel features of construction and advantage will hereinafter more clearly appear in the detailed description of the invention.

For the purpose of illustrating my invention, I have shown in the accompanying drawings a typical embodiment thereof which is at present preferred by me, since this embodiment will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents, in front elevation, a valve attachment, embodying my invention.

Figure 2 represents a section on line 2—2 of Figure 1.

Figure 3 represents a section on line 3—3 of Figure 1.

Similar numerals of reference indicate corresponding parts.

Referring to the drawings.

1 designates standards in which is journalled a shaft 2 which in a glass machine is operatively connected with the motor of the feeding or gathering device in order to be driven thereby, it being of course understood that this shaft may be driven in any desired manner. The shaft 2 has loosely mounted on it a clutch sleeve 3 having a clutch arm 4 which is adapted to co-operate with the clutch arm 5 carried by a co-operating clutch member 6 which is keyed to the shaft 2, as indicated at 7, in order that it can be longitudinally adjusted thereon. The sleeve 3 is provided with a longitudinally extending groove 8 in order to adapt it to adjustably receive a cam block or support 9 which is secured in its adjusted position by means of a set screw 10. The sleeve 3 is of such length that any desired number of such cam blocks or supports can be secured to it in accordance with the number of operations which are to be independently controlled. The cam support 9 is provided with an annular groove 11 formed in a boss or enlargement 12 and secured in the groove 11 by means of fastening devices 13 which pass through apertures 14 is a cam leaf 15 provided with a curved periphery 16 and with the end faces 17 and 18, respectively. I provide a series of apertures 14 in order that a cam leaf 15 can be secured at any desired point on the periphery of the cam support.

The cam face 16 of the cam 15 is adapted to bear against the under face of an arm 19 which is pivotally supported at 20 in a bracket 21 which is secured by means of fastening device 22 to a casing 23 which forms a manifold and which communicates with a source of motive fluid supply such as, for example, compressed air. The casing 23 is flanged at its end and secured to the standards 1 by means of fastening devices 24 which pass through such flanges. The chamber 25 of the casing 23 which is in communication with a source of fluid supply communicates by means of ports 26 with the respective valve support 27, it being understood that a separate port is provided for each valve support. The valve support 27 is provided with a chamber 28 communicating with a port 26 and with a port 29 which latter places the chamber 28 in communication with an annular groove 30 which communicates with ports 32 in a valve casing 33 which latter is provided with a valve chamber 34 in which is adapted to reciprocate a double headed valve 35 which is moved in one direction by means of a spring 36 in order to maintain the valve stem 37 in contact with the arm 19 which actuates it. The valve casing 33 is provided with ports 39 which communicate with an annular groove 40 which is in communication with a pipe 41 leading to the mechanism to be controlled, it being understood that live motive fluid will pass through the pipe 41 when the parts are in the position seen in Figure 2.

The valve casing 33 is also provided with ports 42 which communicate with an annular groove 43 with which is in communication the exhaust ports 44 which lead from the mechanism which is being controlled, it being seen that when the parts are in the position seen in Figure 2, the exhaust from the mechanism being controlled can take place through the pipe 44, groove 43, port 42 and the open end 31 of the valve casing.

The upper end of the casing 33 is provided with a vent 38. The valve casing is also provided with flanges 45 which are secured to the manifold casing 23 by means of fastening devices 46. The valve casing 33 is also provided with the flange 47 which is secured to the support 27 by means of fastening devices 48. The clutch collar 6 is provided in the usual manner with an annular groove 49 to receive the end of a clutch lever 50 which is preferably bifurcated and this controlling lever 50 is fulcrumed at 51 to a fixed point such as, for example, the manifold casing 23.

The operation of my novel mechanism will now be apparent to those skilled in this art to which my invention appertains and is as follows:—

I employ as many valves and their controlling means as may be necessary to perform the different operations in the cycle of any type of machine such as, for example, a glass machine used in the manufacture of glassware. The sleeve 3 which is loosely mounted on the shaft 2 has fixed thereon in proper position the desired number of cam supports 9 and the sleeve adjusted to its proper position by means of the hand wheel 52 mounted on the sleeve, the set collars 53 and 54 retaining the parts in their proper position on the shaft 2 with respect to the clutch collar 6. The cam supports are provided with a row of apertures 14 spaced around their periphery so that the cam leaf 15 can be secured to their respective cam supports by means of the fastening devices 13 in such a manner that they will operate their independent valve mechanism at the desired time during the rotation of the sleeve 3. The driven shaft 2 normally rotates freely within the clutch sleeve 3 but when the lever 50 is actuated to bring the clutch member 5 into the path of the clutch member 4, the sleeve 3 will rotate in unison with the shaft 2, as is evident. This causes the valve 35 during each revolution of the sleeve 3 to be moved outwardly by the arm 19 and the cam 15 in order to permit live motive fluid to pass from the chamber 25 of the manifold through the port 26, chamber 28, groove 30, ports 32 in the valve casing into the valve chamber 34 and therefrom to the port 39, groove 40 and pipe 41 to the mechanism to be controlled. The exhaust takes place as already described through the pipe 44. As soon as the cam 15 passes out of contact with the arm 19 the spring 36 moves the valve 35 downwardly thereby permitting live motive fluid to pass from the valve chamber 34 through the port 42, groove 43 and pipe 44 to the mechanism control to actuate it in a reverse direction from that in which it was formerly actuated. The exhaust from such control mechanism now takes place through the pipe 41, groove 40, ports 39, valve chamber 34 and the vent 38.

It will be apparent that in accordance with my present invention each operation of the machine control can be performed by its own independent valve and the operations of all of the valves are controlled by the manually actuated lever 50.

It will now be apparent that I have devised a novel and useful construction of a valve mechanism for glass machines which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. A valve attachment comprising a driven shaft, a clutch sleeve loosely mounted on said shaft, a clutch collar keyed to said shaft and adapted to cooperate with said clutch sleeve, a plurality of cam supports carried by said sleeve each of said cam supports having an annular groove therein, a cam member circumferentially adjustable in said groove, means to fix a cam member in its adjusted position, an independent valve mechanism independently controlled by each cam member, and a hand wheel carried by said clutch sleeve whereby the clutch sleeve can be partially rotated to determine the proper location of the cams and thereby the timing of the operation of said valve mechanism.

2. A valve attachment comprising standards, a driven shaft journalled in said standards, an intake manifold for live motive fluid carried by said standards, a clutch sleeve loosely mounted on said shaft, a plurality of cam supports adjustable on said clutch sleeve, cam members circumferentially adjustable on said cam support, a manually actuated clutch collar carried by said shaft to control the rotation of said clutch sleeve, and a plurality of independent valve mechanisms in communication with said manifold and carried thereby and operatively connected with said cam members to be controlled by them.

ALBERT R. BETHEL.

Witnesses:
RAE B. LAPER,
MARTHA R. ROBESON.